United States Patent [19]

Harris et al.

[11] Patent Number: 5,436,019
[45] Date of Patent: Jul. 25, 1995

[54] METHOD OF PREPARING REDUCED FAT FOODS

[75] Inventors: Donald W. Harris; Jeanette A. Little, both of Decatur, Ill.

[73] Assignee: A. E. Staley Manufacturing Co., Decatur, Ill.

[21] Appl. No.: 918,951

[22] Filed: Jul. 30, 1992

Related U.S. Application Data

[63] Continuation-in-part of Ser. No. 798,292, Nov. 26, 1991, abandoned, and a continuation-in-part of Ser. No. 908,728, Jul. 6, 1992, which is a continuation of Ser. No. 578,994, Sep. 6, 1990, abandoned, which is a continuation-in-part of Ser. No. 483,208, Feb. 20, 1990, abandoned.

[51] Int. Cl.6 .......................................... A23L 1/05
[52] U.S. Cl. .................................... 426/573; 127/32; 127/71; 252/315.3; 426/578; 426/658; 426/661
[58] Field of Search ............. 426/573, 578, 658, 661, 426/603, 604, 804; 127/29, 32, 33, 36, 38, 39, 40, 58, 65, 69, 70, 71; 252/315.3

[56] References Cited

U.S. PATENT DOCUMENTS

| | | |
|---|---|---|
| 675,822 | 6/1901 | Duryea . |
| 696,949 | 4/1902 | Duryea . |
| 2,068,051 | 1/1937 | Canton .............................. 426/578 |
| 2,131,064 | 9/1938 | Musher ............................. 426/633 |
| 2,503,053 | 4/1950 | Kerr ................................... 127/38 |
| 2,791,508 | 5/1957 | Rivoche ............................ 426/573 |
| 2,805,995 | 9/1957 | Adelson ............................ 252/33.6 |
| 2,978,446 | 4/1961 | Battista ............................. 260/212 |
| 3,023,104 | 2/1962 | Battista ................................... 99/1 |
| 3,067,067 | 12/1962 | Etheridge ............................ 127/71 |
| 3,093,486 | 6/1963 | Krett .................................... 99/144 |
| 3,133,836 | 5/1964 | Winfrey ............................. 127/71 |
| 3,197,337 | 7/1965 | Schink ................................ 127/28 |
| 3,219,483 | 11/1965 | Goos .................................. 127/28 |
| 3,351,489 | 11/1967 | Battista ............................... 127/32 |
| 3,532,602 | 10/1970 | Seidman ............................ 195/31 |
| 3,556,942 | 1/1971 | Hathaway ......................... 195/31 |
| 3,582,359 | 6/1971 | Horn .................................. 426/573 |
| 3,586,536 | 6/1971 | Germino ........................... 127/32 |
| 3,600,186 | 8/1971 | Mattson ................................. 99/1 |
| 3,666,557 | 5/1972 | Jensen ............................... 127/32 |
| 3,671,269 | 6/1972 | Germino ........................... 99/139 |
| 3,705,811 | 12/1972 | Yoshida et al. ..................... 99/91 |
| 3,717,475 | 2/1973 | Germino ............................. 99/134 |
| 3,730,840 | 3/1973 | Sugimoto et al. ................. 195/31 |
| 3,830,697 | 8/1974 | Yoshida et al. .................... 195/31 R |
| 3,879,212 | 4/1975 | Yoshida et al. .................... 106/213 |
| 3,881,991 | 5/1975 | Kurimoto et al. ................. 195/31 |
| 3,883,365 | 5/1975 | Forsberg ............................ 127/60 |
| 3,928,062 | 12/1975 | Yamauchi .......................... 127/60 |
| 3,962,465 | 6/1976 | Richter et al. .................... 426/48 |
| 3,986,890 | 10/1976 | Richter et al. .................... 426/578 X |
| 4,009,291 | 2/1977 | Mitchell ............................. 426/548 |
| 4,069,157 | 1/1978 | Hoover ............................. 210/433 M |
| 4,143,163 | 3/1979 | Hutchison ......................... 426/96 |
| 4,143,174 | 3/1979 | Shah et al. ........................ 426/570 |
| 4,192,900 | 3/1980 | Cheng ............................... 426/578 |
| 4,199,374 | 4/1980 | Dwivedi ............................ 127/60 |
| 4,209,503 | 6/1980 | Shah et al. ........................ 424/49 |
| 4,263,334 | 4/1981 | McGinley ......................... 426/573 |
| 4,276,312 | 6/1981 | Merritt ............................... 426/96 |
| 4,291,065 | 9/1981 | Zobel ................................. 426/549 |
| 4,305,964 | 12/1981 | Moran et al. ...................... 426/99 |

(List continued on next page.)

FOREIGN PATENT DOCUMENTS 1016006 8/1977 Canada .

(List continued on next page.)

OTHER PUBLICATIONS

Allmere et al., Derwent Abstract 93-174080 for SU 1736975, Jun. 1989.

(List continued on next page.)

Primary Examiner—Donald E. Czaja
Assistant Examiner—Leslie Wong
Attorney, Agent, or Firm—Arnold, White & Durkee

[57] ABSTRACT

A method of preparing reduced fat foods is provided which employs a fragmented, α-amylase hydrolyzed amylose precipitate. Amylose is precipitated and hydrolyzed with α-amylase and then fragmented to form an aqueous dispersion that is useful in replacing fat in a variety of food formulations. The amylose can be derived from a native starch which contains amylose, e.g. common corn starch and high amylose corn starch, by gelatinizing the starch followed by precipitation of the amylose.

13 Claims, 1 Drawing Sheet

U.S. PATENT DOCUMENTS

| | | | |
|---|---|---|---|
| 4,308,294 | 12/1981 | Rispoli | 426/564 |
| 4,423,084 | 12/1982 | Trainor | 426/589 |
| 4,477,480 | 10/1984 | Seidel | 426/578 |
| 4,492,714 | 1/1985 | Cooper | 426/602 |
| 4,510,166 | 4/1985 | Lenchin | 426/565 |
| 4,533,254 | 8/1985 | Cook | 366/176 |
| 4,536,408 | 8/1985 | Morehouse | 426/250 |
| 4,551,177 | 11/1985 | Trubiano | 106/210 |
| 4,560,559 | 12/1985 | Ottenburg | 426/19 |
| 4,587,131 | 5/1986 | Bodor | 426/603 |
| 4,591,507 | 5/1986 | Bodor | 426/604 |
| 4,643,773 | 2/1987 | Day | 127/30 |
| 4,670,272 | 6/1987 | Chen | 426/573 |
| 4,726,957 | 2/1988 | Lacourse | 426/578 |
| 4,728,526 | 3/1988 | Avera | 426/633 |
| 4,744,987 | 5/1988 | Mehra | 424/156 |
| 4,761,292 | 8/1988 | Augustine | 426/321 |
| 4,787,939 | 11/1989 | Barker | 127/37 |
| 4,810,307 | 3/1989 | Caton | 127/63 |
| 4,810,646 | 3/1989 | Jamas et al. | 435/101 |
| 4,814,195 | 3/1989 | Yokohama | 426/633 |
| 4,828,868 | 5/1989 | Lasdon | 426/633 |
| 4,832,977 | 5/1989 | Avera | 426/633 |
| 4,859,484 | 8/1989 | Bielskis | 426/96 |
| 4,869,919 | 9/1989 | Lowery | 426/604 |
| 4,885,180 | 12/1989 | Cochran | 426/241 |
| 4,886,678 | 12/1989 | Chiu | 426/578 |
| 4,911,946 | 3/1990 | Singer | 426/658 |
| 4,917,915 | 4/1990 | Cain | 426/573 |
| 4,937,091 | 6/1990 | Zallie | 426/582 |
| 4,942,055 | 7/1990 | Avera | 426/633 |
| 4,948,615 | 8/1990 | Zallie | 426/573 |
| 4,957,750 | 9/1990 | Cochran | 426/19 |
| 4,962,094 | 10/1990 | Jamas et al. | 514/54 |
| 4,971,723 | 11/1990 | Chiu | 426/578 X |
| 4,981,709 | 1/1991 | Furcsik | 426/565 |
| 4,988,531 | 1/1991 | Moore | 426/578 |
| 4,990,355 | 2/1991 | Gupta | 426/602 |
| 5,034,240 | 7/1991 | Tanaka | 426/607 |
| 5,035,904 | 7/1991 | Huang | 426/243 |
| 5,037,929 | 8/1991 | Rajagopalan | 426/578 |
| 5,051,271 | 9/1991 | Iyengar | 426/658 |
| 5,094,872 | 3/1992 | Furcsik et al. | 426/578 |
| 5,104,674 | 4/1992 | Chen et al. | 426/573 |
| 5,106,644 | 4/1992 | El-Nokaly | 426/603 |
| 5,110,612 | 5/1992 | Quarles | 426/573 |
| 5,131,953 | 7/1992 | Kasica et al. | 127/65 |
| 5,137,742 | 8/1992 | Bakal et al. | 426/589 |
| 5,147,665 | 9/1992 | Furcsik | 426/19 |
| 5,192,569 | 3/1993 | McGinley et al. | 426/96 |

FOREIGN PATENT DOCUMENTS

| | | |
|---|---|---|
| 0052899 | 2/1982 | European Pat. Off. |
| 0237120 | 9/1987 | European Pat. Off. |
| 0298561 | 1/1989 | European Pat. Off. |
| 0327120 | 8/1989 | European Pat. Off. |
| 0327288 | 8/1989 | European Pat. Off. |
| 0340035 | 11/1989 | European Pat. Off. |
| 0367064 | 5/1990 | European Pat. Off. |
| 0372184 | 6/1990 | European Pat. Off. |
| 0387940 | 9/1990 | European Pat. Off. |
| 0420314 | 4/1991 | European Pat. Off. |
| 0420315 | 4/1991 | European Pat. Off. |
| 0427312 | 5/1991 | European Pat. Off. |
| 0430329 | 6/1991 | European Pat. Off. |
| 0443844 | 8/1991 | European Pat. Off. |
| 0470870 | 2/1992 | European Pat. Off. |
| 0480433 | 4/1992 | European Pat. Off. |
| 0486936 | 5/1992 | European Pat. Off. |
| 142646A | 7/1980 | German Dem. Rep. |
| 161178A | 5/1985 | German Dem. Rep. |
| 110957 | of 1897 | Germany |
| 60-160833 | 8/1985 | Japan |
| 3-296501 | 12/1991 | Japan |
| 4-46901 | 2/1992 | Japan |
| 2247242 | 2/1992 | United Kingdom |
| WO87/04465 | 7/1987 | WIPO |
| WO89/12403 | 12/1989 | WIPO |
| WO90/00010 | 1/1990 | WIPO |
| WO90/06343 | 6/1990 | WIPO |
| WO90/15147 | 12/1990 | WIPO |
| WO91/01091 | 2/1991 | WIPO |
| WO91/01092 | 2/1991 | WIPO |
| WO91/07106 | 5/1991 | WIPO |
| 9112728 | 9/1991 | WIPO |
| 9202614 | 2/1992 | WIPO |
| WO92/21703 | 12/1992 | WIPO |

OTHER PUBLICATIONS

D. Duxbury, "Pre-Hydrated Gums Eliminate Lumping, Long Hydration Times", *Food Processing* (Jun. 1992).

"Stellar Fat Replacer", a technical data sheet, published by A. E. Staley Manufacturing Company, TDS 513 192250.

"Stellar Fat Replacer; Structure", a technical information bulletin, published by A. E. Staley Manufacturing Company, TIB 29 195060.

(List continued on next page.)

OTHER PUBLICATIONS

"Stellar Fat Replacer; Handling, Storage and Preparation", a technical information bulletin, published by A. E. Staley Manufacturing Company, TIB 28 195060.
Tegge, "Produkte der sauren Stärkehydrolyse", Die Stärken, pp. 244–246 (1981), (English translation).
"Avicel RC in canned foods", bulletin no. RC–31, FMC Corp. (May 1972).
"Avicel microcrystalline cellulose; the non-caloric ingredient", bulletin, American Viscose Corp.
"Avicel RC 581 Technical Bulletin", bulletin No. RC–11, FMC Corp., Nov. 1969–1M.
"Avicel RC–591 in foods", bulletin No. RC–22, FMC Corp. (May 1971).
"Avicel RC in bakery products", bulletin No. RC–35, FMC Corp.
"Avicel pricing", bulletin, American Viscose Corp. (Jan. 1961).
"C9–112 microcrystalline starch", bulletin, A. E. Staley Mfg. Co. (Jan. 1972), with notes by A. H. Young.
"Food labelling; definitions of the terms cholestrol free, low cholesterol, and reduced cholesterol", 55 Fed. Reg. 29456 (1990).
"Food labelling; serving sizes", 55 Fed. Reg. 29517 (1990).
"Low fat ground beef patties", brochure, A. E. Staley Mfg. Co. (Oct. 1991).
"Low-fat pork sausage patty", formula sheet CFSF7 196211, A. E. Staley Mfg. Co.
"Nepol Amylose", market development bulletin No. 101, A. E. Staley Mfg. Co. (1962).
"New generation of foods with reduced fat", Food Engineering, pp. 23–26 (Jan. 1990).
"Paselli SA2; the natural alternative to fats and oils", product bulletin, AVEBE b.a., Foxhol., Holland, ref. No. 05.12.31.167 EE (Jun. 1988).
"RANNIE High Pressure Laboratory Homogenizer", service manual, Rannie a/s, Roholmsvej 8, DK–2620, Denmark (1988).
"Reduced oil salad dressing", technical publication, A. E. Staley Mfg. Co.
"Solve tough process filtration problems with Ceraflo ceramic systems", technical bulletin, lit. No. SD113, Feb. 1989, 89–418, Millipore Corp. (1989).
"Sta-SLIM starches", technical data sheet, TDS 507 096060, A. E. Staley Mfg. Co.
"Staley Formulation of Food Starch-Modified", new product review presented to U.S. Food and Drug Administration by A. E. Staley Mfg. Co. (Nov. 1990).
Ambler, "Centrifugation", Handbook of Separation Techniques for Chemical Engineers, pp. 4–60 to 4–88 (McGraw Hill 1988).
Applewhite, "Fats and fatty oils", Encyclopedia of Chemical Technology, vol. 9, pp. 795–831 (Kirk–Othmer, eds., John Wiley & Sons 1980).
Atwell et al, "Characterization of quinoa starch", Cereal Chemistry, vol. 60, pp. 9–11 (1983).
Battista et al, "Colloidal macromolecular phenomena. Part II. Novel microcrystals of polymers", Journal of Applied Polymer Science, vol. 11, pp. 481–498 (1967).
Battista et al., "Microcrystalline cellulose", Industrial and Engineering Chemistry, vol. 54, pp. 20–29 (1962).
BeMiller, "Gums", Encyclopedia of Food Science & Technology, vol. 2, pp. 1338–1344 (John Wiley & Sons 1992).
Bouchard et al, "High performance liquid chromatographic monitoring of carbohydrate fractions in partially hydrolyzed corn starch", J. Agric. Food Chem., vol. 36, pp. 1188–1192 (1988).
Dickinson, "Particle gels", Chemistry & Industry, pp. 595–599 (Oct. 1990).
Dillon, "Gums and starches bulk up low-cal foods", Food Engineering, pp. 87–90 (Jan. 1990).
Duxbury, "Modified food starches partially replace fats, oils & provide smooth texture", Food Processing, pp. 86–88 (Nov. 1990).
Duxbury, "Fat-sparing starch can replace 100% fat/oil for 96% calorie reduction", Food Processing, p. 38 (Dec. 1990).
Dziezak, "Emulsifiers: the interfacial key to emulsion stability", Food Technology, vol. 42, No. 10, pp. 171–186 (Oct. 1988).
Dziezak, "Membrane separation technology offers processors unlimited potential", Food Technology, pp. 108–113 (Sep. 1990).
Erdi et al, "Rheological characteristics of polymeric microcrystal-gels", Journal of Colloid and Interface Science, vol. 28, pp. 36–47 (1968).
Falkiewicz, "Avicel in suspensions—dispersion, rheology and colloid science", Soap, Cosmetics, Chemical Specialties, pp. 27–34 (Apr. 1979).
Faulkner et al, "Size reduction", Encyclopedia of (List continued on next page.)

OTHER PUBLICATIONS

Chemical Technology, vol. 21, pp. 132–162 (Kirk Othmer eds., John Wiley & Sons, 1983).

Ghiasi et al, "Effects of flour components and dough ingredients on starch gelatinization", Cereal Chemistry, vol. 60, No. 1, pp. 58–61 (1983).

Giese, "Developing low-fat meat products", Food Technology, pp. 100–108 (Apr. 1992).

Griffin, "Emulsions", Encyclopedia of Chemical Technology, vol. 8, pp. 900–930 (Kirk-Othmer, eds., John Wiley & Sons, 3d ed. 1979).

Jane et al, "Structure studies of amylose-V complexes and retrograded amylose by action of alpha amylases, and a new method for preparing amylodextrins", Carbohydrate Research, vol. 132, pp. 105–118 (1984).

Jane et al, "Preparation and properties of small particle corn starch", Cereal Chemistry, vol. 69, pp. 280–283 (1992).

Kerr, Chemistry and Industry of Starch, 2d ed., pp. 564–567 (Academic Press 1950).

Klinkowski, "Ultrafiltration", Encyclopedia of Chemical Technology, vol. 23, pp. 439–461 (Kirk-Othmer, eds., John Wiley & Sons, 3d ed. 1983).

Knightly, "The evolution of softeners and conditioners used in baked foods", The Bakers Digest, pp. 64–75 (Oct. 1973).

Koizumi et al, "High performance anion-exchange chromatography of homogenous D-gluco oligosaccharides and polysaccharides (polymerization degree equal to or greater that 50) with pulsed amphoteric detection", Journal of Chromatography, vol. 46, pp. 365–373 (1989).

Krog, "Functions of emulsifiers in food systems", J. Am. Oil Chemists' Society, vol. 54, pp. 124–131 (1978).

Lansky et al, "Properties of the fractions and linear subfractions from various starches", vol. 71, pp. 4066–4075 (1949).

Larrson et al, "Annealing of starch at an intermediate water content", Starch/Starke, vol. 43, No. 6, pp. 227–231 (Jun. 1991).

Lavanchy et al, "Centrifugal separation", Encyclopedia of Chemical Technology, vol. 5, pp. 194–233 (Kirk-Othmer, eds., John Wiley & Sons, 3d ed., 1979).

Luu et al, "Model structure for liquid water, etc.", Travaux de la Societe de Pharmacie de Montpellier, vol. 41, No. 3, pp. 203–212 (1981) (Translation Attached).

Manley, Technology of Biscuits, Crackers and Cookies, pp. 335–347 (Ellis Horwood 1983).

Mason, "Chemistry with ultrasound", Critical Reports on Applied Chemistry, vol. 28, pp. 1–26, 91–98, 159–187 (Elsevier Science Publishers 1990).

Matthews, Legumes: Chemistry, Technology, and Human Nutrition, pp. 226–229 (Marcel Dekker 1989).

Matz, Cookie and Cracker Technology, pp. 163–167 (AVI Publishing 1968).

Mussulman et al, "Electron microscopy of unmodified and acid-modified corn starches", Cereal Chemistry, vol. 45, pp. 162–171 (1968).

Nara et al, "Study on relative crystallinity of moist potato starch", Starke/Starch, vol. 30, pp. 111–114 (1978).

Orr, "Size measurement of particles", Encyclopedia of Chemical Technology, vol. 21, pp. 106–131 (Kirk Othmer eds., John Wiley & Sons, 1983).

Pancoast et al, Handbook of Sugars, pp. 157–287 (AVI Publishing 1980).

Patterson, Hydrogenation of Fats and Oils, pp. 44–48, 173–182, 291–304 (Applied Science Publishers, 1983).

Paul et al, "Membrane technology", Encyclopedia of Chemical Technology, vol. 15, pp. 92–131 (Kirk-Othmer, eds., John Wiley & Sons, 3d ed. 1981).

Pszczola, "Oat-bran-based ingredient blend replaces fat in ground beef and park sausage", Food Techology, pp. 60–66 (Nov. 1991).

Rees et al, "Homogenizers", Encyclopedia of Foods Engineering, pp. 467–472 (Hall et al eds., AVI Publ. 1986).

Reuter, "Homogenization", Encyclopedia of Food Science, pp. 374–376 (Peterson et al eds., AVI Publ. Co., 1978).

Reuther et al, "Structure of maltodextrin gels—a small angle X-ray scattering study", Colloid and Polymer Science, vol. 261, pp. 271–276 (1983).

Richards, Breads, Rolls and Sweet Doughs, pp. 92–95 (Peacock Business Press, 1973).

Richardson, "Molecular mobilities of instant starch gels determined by oxygen-17 and carbon-14 nuclear magnetic resonance", Journal of Food Science, vol. 53, pp. 1175–1180 (1988).

Russell et al, "Characterization of resistant starch from wheat and maize", Journal of Cereal Science, vol. 9, pp. 1–15 (1989).

(List continued on next page.)

OTHER PUBLICATIONS

Sanderson, "Polysaccharides in foods", Food Technology, pp. 50–57 and 83 (Jul. 1981).

Savage et al, "Effects of certain sugars and sugar alcohols on the swelling of cornstarch granules", Cereal Chemistry, vol. 55, No. 4, pp. 447–454 (1978).

Shannon et al, "Genetics and physiology of starch development", Starch: Chemistry and Technology, pp. 25–35 (Whistler et al eds., Academic Press 1984).

Sievert et al, "Enzyme resistant starch. I. Characterization and evaluation of enzymatic, thermoanalytical, and microscopic methods", Cereal Chemistry, vol. 66, pp. 342–347 (1989).

Spies et al, "Effect of sugars on starch gelatinization", Cereal Chemistry, vol. 59, No. 2, pp. 128–131 (1982).

Stadelman et al, Egg and Poultry Meat Processing, pp. 52–63 (Ellis Horwood 1988).

Stute, "Hydrothermal modification of starches: the difference between annealing and heat/moisture-treatment", Starch/Staerke, vol. 44, pp. 205–214 (1992).

Swientek, "'Microfluidizing' technology enhances emulsion stability", Food Processing, pp. 152–153 (Jun. 1990).

Taki, "Functional ingredient blend produces low-fat meat products to meet consumer expectations", Food Technology, pp. 70–74 (Nov. 1991).

Teot, "Resins, water-soluble", Encyclopedia of Chemical Technology, vol. 20, pp. 207–230 (John Wiley & Sons 1982).

Trout, "Pasteurization", Encyclopedia of Food Science, pp. 600–604 (Peterson et al eds., AVI Publ. Co., 1978).

Wang, "Meat processing I", Encyclopedia of Food Engineering, pp. 545–557 (AVI Publishing 1986).

Whistler et al, "Effect of acid hydrolysis on the retrogradation of amylose", Cereal Chemistry, vol. 25, No. 6, pp. 418–424 (1948).

White et al, "Predicting gelatinization temperatures of starch/sweetener systems for cake formulations by differential scanning calorimetry. I. Development of model", Cereal Foods World, vol. 35, No. 8, pp. 728–731 (Aug. 1990).

Wilhoft, "Recent developments on the bread staling problem", The Bakers Digest, pp. 14–20 (Dec. 1973).

Wurzburg, Modified Starches: Properties and Uses, pp. 18–23, 38–40, 244–245, and 251–252 (CRC Press, 1986).

Yamaguchi et al, "Electron microscopic observations of waxy maize starch", Journal of Ultrastructure Research, vol. 69, pp. 249–261 (1979).

Young, "Evaluation of microcrystals prepared from MIRA-QUIK C in the pilot spray dried in the presence of sodium carboxymethylcellulose (C9-112)", project report No. RD 73-17, A. E. Staley Mfg. Co. (Apr. 1973).

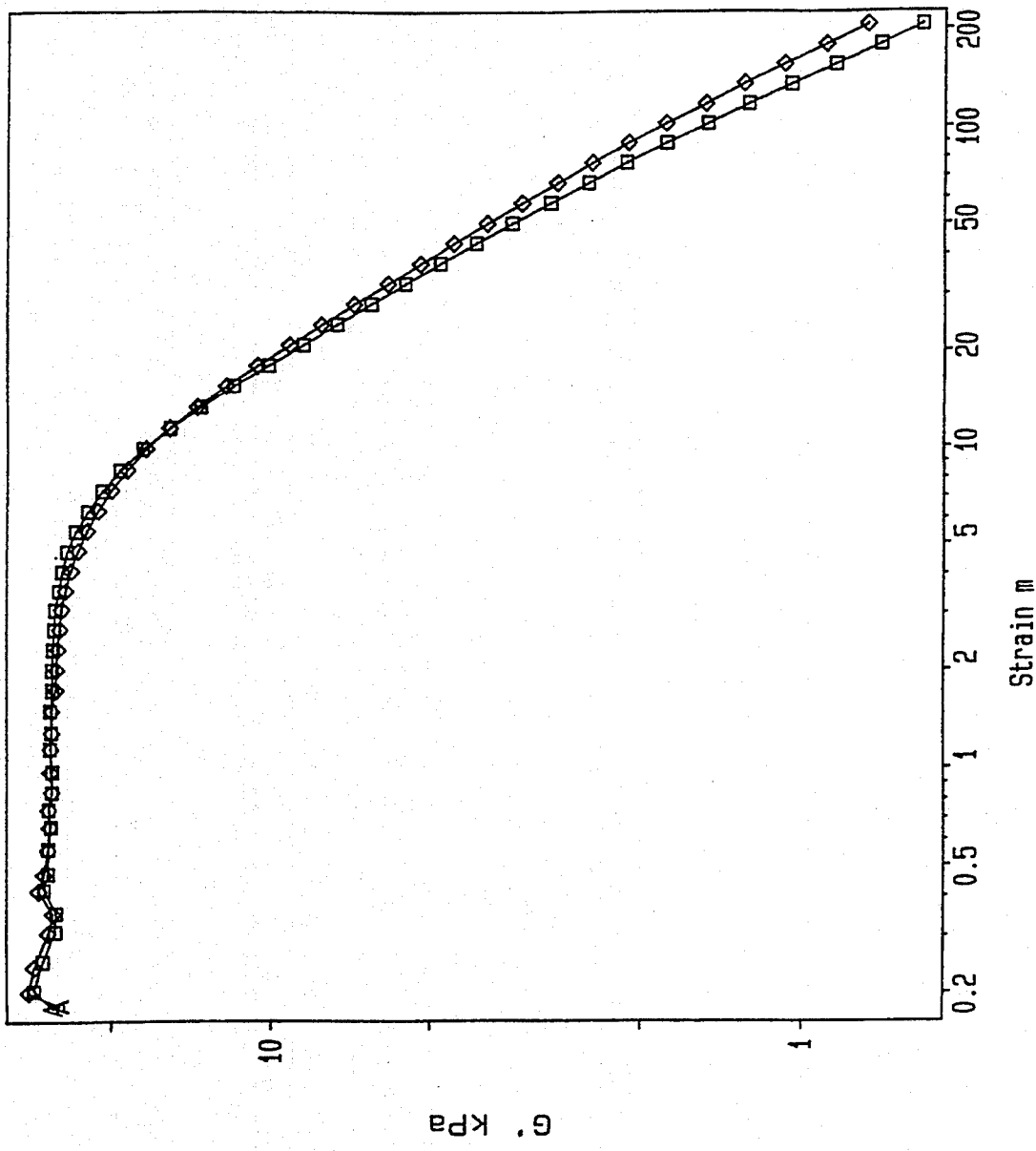

METHOD OF PREPARING REDUCED FAT FOODS

CROSS-REFERENCE TO RELATED FAT FOODS

This application is a continuation-in-part of U.S. application Ser. No. 07/798,292, filed Nov. 26, 1991, now abandoned, the disclosure of which is incorporated herein by reference. This application is also a continuation-in-part of U.S. application Ser. No. 07/908,728, filed Jul. 6, 1992, which was a continuation of U.S. application Ser. No. 07/578,994, filed Sep. 6, 1990, now abandoned, which as a continuation-in-part of U.S. application Ser. No. 07/483,208, filed Feb. 20, 1990, now abandoned.

FIELD OF THE INVENTION

This invention relates to food formulations in which at least a portion of the fat and/or oil is replaced by a carbohydrate.

BACKGROUND OF THE INVENTION

U.S. Pat. No. 4,510,166 (Lenchin et al.) discloses converted starches having a DE less than 5 and certain paste and gel characteristics which are used as a fat and/or oil replacement in various foods, including ice cream and mayonnaise. The converted starches are described as dextrins, acid-converted starches (fluidity starches), enzyme-converted starches and oxidized starches. It is also disclosed that if the converted starches are not rendered cold-water soluble by the conversion, they are pregelatinized prior to use or cooked during use.

A product bulletin entitled "Paselli SA2; The Natural Alternative to Fats and Oils" (AVEBE b.a., Foxhol, Holland, Ref. No. 05.12.31.167 EF) discloses the use of a low-DE-hydrolysate (DE less than 3) made from potato starch as a replacement for fifty percent of the fat with an amount of the low-DE-potato starch hydrolysate plus water (starch hydrolysate at 28% dry solids) equal to the amount of fat replaced.

U.S. Pat. Nos. 3,962,465 (Richter et al.) and 3,986,890 (Richter et al.) disclose the use of thermoreversible gels of a starch hydrolysate (formed by enzymatic hydrolysis) as a substitute for fat in a variety of foods, including cake creams and fillings, mayonnaise and remoulades, cream cheeses and other cheese preparations, bread spreads, pastes, meat and sausage products, and whipped cream.

U.S. Pat. No. 4,971,723 (Chiu) discloses partially debranched starch prepared by enzymatic hydrolysis of the $\alpha$-1,6-D-glucosidic bonds of the starch, comprising amylopectin, partially debranched amylopectin and up to 80% by weight, short chain amylose and that the partially debranched starch is useful in a variety of ways depending upon the degree of debranching. It is disclosed that a waxy maize starch (or other waxy starch) can be partially debranched (i.e. to 25% to 70% short chain amylose) to yield sufficient short chain amylose to form a thermally reversible gel in an aqueous starch suspension. It is further disclosed that the same degree of debranching of waxy starches is preferred for lending a fat-like, lubricating texture to an aqueous starch dispersion.

PCT Publication No. WO 91/07106, published May 30, 1991, discloses a method of preparing a food grade, insoluble bulking agent from starch that is also disclosed to be useful as a bulking or texturizing agent in low-fat food formulations. The method of preparing the starch comprises a retrogradation process followed by enzymatic (e.g., $\alpha$-amylase) or chemical (e.g., acid) hydrolysis of amorphous regions in the retrograded product. In this process, amylose is allowed to retrograde from a solution of gelatinized starch. The hydrolysis is then undertaken to reduce or eliminate amorphous regions in the retrograded product.

SUMMARY OF THE INVENTION

In one aspect, this invention relates to a food formulation having a reduced level of fat and/or oil comprising a mixture of a foodstuff and a particle gel as a replacement for at least a substantial portion of the fat and/or oil of said foodstuff, said particle gel comprising a minor amount of a fragmented, $\alpha$-amylase hydrolyzed amylose precipitate and a major amount of an aqueous liquid.

In another aspect, this invention relates to a method of formulating a food containing a fat and/or oil ingredient comprising replacing at least a substantial portion of said fat and/or oil ingredient with a particle gel as a replacement for at least a substantial portion of the fat and/or oil of said foodstuff, said particle gel comprising a minor amount of a fragmented, $\alpha$-amylase hydrolyzed amylose precipitate and a major amount of an aqueous liquid.

By "fragmented, $\alpha$-amylase hydrolyzed amylose precipitate" is meant a starch material comprised of amylose which has been subjected to precipitation of the amylose followed by hydrolysis by $\alpha$-amylase enzyme and then mechanical disintegration of the hydrolyzed precipitate into fragments. The hydrolysis and disintegration will be sufficient to produce a precipitate which will form an aqueous dispersion having the characteristics of a particle gel.

In another aspect, this invention relates to a method of making a composition of matter useful in replacing fat and/or oil in a food formulation comprising physically fragmenting a minor amount of an $\alpha$-amylase hydrolyzed amylose precipitate in a major amount of an aqueous liquid, the degree of said physically fragmenting being sufficient to form a particle gel of said composition.

In another aspect, this invention relates to an aqueous dispersion useful as a replacement for fats and/or oils comprising a major amount by weight of water and a minor amount by weight of a fragmented, $\alpha$-amylase hydrolyzed amylose precipitate, the degree of hydrolysis and fragmentation of said precipitate being sufficient to form a particle gel of said dispersion.

The terms "foodstuff" and "food", as used herein, are intended to broadly cover nutritional and/or functional materials that are ingested by humans in the course of consuming edible fare. The term "fats and/or oils" is intended to broadly cover edible lipids in general, specifically the fatty acid triglycerides commonly found in foods. The terms thus include solid fats, plastic shortenings, fluid oils (and fully or partially hydrogenareal oils), and the like. Common fatty acid triglycerides include cottonseed oil, soybean oil, corn oil, peanut oil, canola oil, sesame oil, palm oil, palm kernel oil, menhaden oil, whale oil, lard, and tallow. The technology of fats and/or oils is described generally by T. H. Applewhite, "Fats and Fatty Oils", Encyclopedia of Chemical Technology, Vol. 9, pp. 795–831 (Kirk-Othmer, eds., John Wiley & Sons, Inc., New York, N.Y., 3d ed., 1980), the disclosure of which is incorporated by reference.

The use of the terms "major" and "minor" in context together in this specification is meant to imply that the major component is present in a greater amount by weight than the minor component, and no more nor less should be inferred therefrom unless expressly noted otherwise in context.

BRIEF DESCRIPTION OF THE DRAWINGS

FIG. 1 shows the results of duplicate analyses of the dynamic elastic modulus (G') in kilo pascals as a function of strain (m) for a particle gel of fragmented α-amylase hydrolyzed amylose precipitate at 10% precipitate solids.

DETAILED DESCRIPTION OF THE INVENTION

The fragmented, α-amylase hydrolyzed amylose precipitate is made by the sequential steps of precipitation, enzymatic hydrolysis, and fragmentation of a starch material containing amylose. Starch is generally comprised of a highly-branched glucan having α-1,4 and α-1,6 linkages, denominated amylopectin, and a substantially linear glucan, having almost exclusively α-1,4 linkages, denominated amylose. Methods of determining the amounts of each are referenced in R. L. Whistler et al., Starch: Chemistry and Technology, pp. 25-35 (Academic Press, Inc., New York, N.Y., 1984), the disclosure of which is incorporated by reference. As used herein, the term "amylose" includes native amylose and, unless otherwise expressly noted in context, modified amylose. Examples of modified amylose include acid-modified amylose, enzyme-modified amylose (e.g. α-amylase, β-amylase, isoamylase, or pullulanase) and chemically substituted amylose, provided the levels of chemical substitution (e.g. hydroxypropylation, crosslinking, etc.) are insufficient to prevent precipitation and enzymatic hydrolysis of the amylose to the desired degree. Starches having a substantial proportion (i.e. at least 15% by weight) of amylose are preferred and examples of these include the common non-mutant starches of cereals, tubers and legumes, e.g. corn, wheat, rice, potato, tapioca, and pea. Preferred for use herein are starches derived from corn (Zea mays) such as common corn starch and high amylose corn starch, each of which are examples of starches containing greater than 15% amylose. Examples of such starches from high amylose corn include HI-SET ® C and HY-LON ™ (each about 55% amylose by weight) and HYLON ™ VII (about 70% amylose by weight), all available from National Starch and Chemical Corporation, Bridgewater, N.J.

In certain embodiments, the starch is comprised of a major amount of amylose. In such embodiments, the starch employed is from a mutant variety of native starch which contains a major amount of amylose or is obtained by fractionation of amylose from a starch variety containing both amylose and amylopectin. Methods for the fractionation of amylose and amylopectin from native starch are disclosed in, for example, U.S. Pat. No. 3,067,067 (Etheridge).

If the starch chosen as a starting material is not in pre-gelatinized or instant form, the starch must be gelatinized or pasted prior to precipitation of the amylose. The gelatinization or pasting process disrupts, at least in substantial part, the associative bonding of the starch molecules in the starch granule. This permits the amylose to associate and precipitate. This disruption is accomplished by heating a slurry of the starch to a sufficient temperature for a sufficient length of time depending upon the inherent resistance of the particular starch to gelatinization and the amount of moisture present in the slurry. The slurry will typically be comprised of a major amount of water (i.e. at least 50% by weight) and a minor amount of the starch starting material (i.e. less than about 50% by weight). Preferably, the starch slurry will contain at least about 5% starch, typically between about 10% to about 25% starch. The pH of the slurry will generally be substantially neutral, i.e. from about 3.5 to about 9 and more preferably from about 6 to 8, to minimize hydrolysis of the starch molecules. The time, temperature, slurry solids and pH should be optimized to gelatinize the starch, yet minimize hydrolysis of the starch.

The appropriate temperature, pressure and period of treatment needed to provide a starch paste is preferably obtained by processing aqueous starch slurries in equipment commonly known in the art as steam injection heaters or jet cookers. In such equipment, superatmospheric steam is injected and mixed with a water slurry of starch in a throat section of a jet. Upon contact with the injected steam, the starch granules are uniformly and thermally treated under turbulent conditions whereupon the starch granules are gelatinized and solubilized. Examples of steam injection heaters wherein the temperature, pressure and feed rate can be regulated to provide the desired starch pastes are disclosed in U.S. Pat. Nos. 3,197,337; 3,219,483; and 3,133,836. More uniformly solubilized starch pastes are obtained by use of the steam injection heater in combination with a holding zone such as coiled tubing or a pressurized tank constructed to minimize liquid channeling. Other pasting equipment, e.g. heat exchangers, homogenizers, cookers, votators, sizeometer cookers, kettle cookers, etc., may be employed provided the pasting conditions can be adequately maintained.

The starch solution may also be treated to remove impurities therefrom. Treatment with, for example, activated carbon will remove residual proteins and lipids that may contribute to off-flavors and/or colors.

The gelatinized starch is then optionally treated with a debranching enzyme, i.e. an enzyme capable of hydrolyzing the 1,6-glucosidic bond of amylopectin without significant capability of hydrolyzing the 1,4-glucosidic bond. Enzymes from a variety of sources are capable of debranching amylopectin. U.S. Pat. No. 3,370,840 (Sugimoto et al.) describes sources of debranching enzymes, the disclosure of which is incorporated herein by reference. Examples of useful enzymes include pullulanases derived from bacteria of the genus Aerobacter (e.g. E.C. 3.2.1.41 pullulan 6-glucanohydrolase) and isoamylases derived from bacteria of the genus Pseudomonas (e.g. E.C. 3.2.1.68 glycogen 6-glucanohydrolase). Particularly useful enzymes include thermostable enzymes, e.g. thermostable pullulanases as disclosed in PCT Publ. No. WO 92/02614, published Feb. 20, 1992, the disclosure of which is incorporated by reference, and which are obtained from members of the genus Pyrococcus. The debranching enzyme may be in solution during debranching or it may be immobilized on a solid support.

The debranching enzyme preparation should be as specific as possible for the hydrolysis of the 1,6-glucosidic bond of amylopectin and amylose. Thus, the enzyme preparation, if it contains a mixture of enzymes, is preferably essentially free of enzymes capable of hydrolyzing α-1,4-glucosidic bonds. Minimizing hydrolysis of α-1,4-glucosidic bonds will help to minimize the amounts of dextrose and soluble oligomers produced during debranching. Because these soluble saccharides are not believed to contribute to the functionality of the debranched material, minimizing their production will enhance the yield of functional material.

The debranching enzyme is allowed to act upon the solubilized starch containing amylopectin. The optimum concentration of enzyme and substrate in the debranching medium will, in general, depend upon the level of activity of the enzyme which, in turn, will vary depending upon the enzyme source, enzyme supplier and the concentration of the enzyme in commercial batches. When the isoamylase E.C. 3.2.1.68, derived from Pseudomonas amyloderamosa, available from Sigma Chemical Co., St. Louis, Mo., is employed, typical conditions include the treatment of a starch solution at 5% to 30% by weight starch solids with about 50 units of enzyme, per gram of starch, for a period of about 48 hours to obtain substantially complete debranching.

The optimum pH and temperature of the debranching medium will also depend upon the choice of enzyme. The debranching medium may, in addition to the water used to solubilize the starch, contain buffers to ensure that the pH will be maintained at an optimum level throughout the debranching. Examples of useful buffers include acetates, citrates, and the salts of other weak acids. With the isoamylase described above, the pH is preferably maintained at about 4.0 to 5.0 and the temperature from about 40° C. to about 50° C. With the thermostable pullulanase described above, the pH is preferably maintained between 5 and 7 and the optimum temperature should be between 85° C. and 115° C.

The debranching is allowed to proceed until the desired degree of debranching has been obtained. The precise degree of debranching needed to obtain the desired particle gel of the debranched amylopectin starch may vary depending upon the source of the starch and the precise properties desired in the resulting gel. Preferably, the degree of debranching is sufficient to convert more than about 80% of the amylopectin in the starch to short chain amylose and, more preferably, at least about 90% of the amylopectin.

In preferred embodiments, essentially all of the amylopectin is converted to short chain amylose. The amount of short chain amylose can be measured by gel permeation chromatography as set forth in U.S. Pat. No. 4,971,723, wherein short chain amylose is calculated from the relative area of the peak obtained within the molecular weight range of 500 to 20,000. Thus, preferably less than 20% of the amylopectin that was originally present will be present as molecular species having a molecular weight in excess of 20,000 g/mol, and most preferably, essentially no amylopectin having a molecular weight in excess of 20,000 g/mol will remain. (It should be noted that if amylose is present, at least a portion thereof may be debranched to produce molecules above the 20,000 g/mol cut-off and molecules below the 20,000 g/mol cut-off. To measure how much of the material eluting between 500 g/mol and 20,000 g/mol is debranched amylopectin and how much is debranched amylose, it may be necessary to fractionate the starting starch into its amylose and amylopectin fractions and then debranch and elute each fraction separately.)

The solution of gelatinized starch is then allowed to form a precipitate. Generally, the solution will be cooled from the temperature at which the starch is pasted to reduce the solubility of the gelatinized starch therein. The solution will typically be held at elevated temperature (e.g. 65° C. to 90° C.) until substantial equilibrium is achieved between the supernatant and the precipitate. The precipitate can be isolated from the supernatant, e.g. by centrifugation, prior to fragmentation, but isolation from the supernatant is not necessary to form a useful product.

Heating (e.g. to about 70° C.) of the particles while in contact with the aqueous medium to dissolve at least a portion of the mass of the particles and then cooling of the suspension/solution can also be employed in forming the particle gel of this invention. This heating to an elevated temperature and then reformation of the particles tends to make the particles resistant to melting or dissolving when an aqueous dispersion of the particles is exposed to heat in processing, e.g. in a pasteurization step. In general, the higher the temperature to which the particles in the liquid medium are heated (and thus the greater the amount of precipitate that is redissolved,), the higher the temperature at which the resulting aqueous dispersion of the particles will be stable. Repetition of the dissolving and reformation may improve the temperature stability of the resulting aqueous dispersion.

It is also advantageous to heat the precipitate to redissolve a substantial portion of the low melting polysaccharides and then treat the heated suspension of precipitate with acid or enzyme to hydrolyze soluble polysaccharides in the solution. (It may also be advantageous to filter the slurry while hot to remove soluble polysaccharides or their hydrolysates.) The dissolving and reprecipitation steps alone improve the stability of the aqueous dispersion by increasing the amount of the fragmented precipitate which remains as insoluble fragments in an aqueous dispersion that is exposed to heat. Further, a slow rate of heating and/or cooling (e.g. from about 0.005° C./min. to about 0.5° C./min. for each ) may be advantageous. However, the remaining soluble fraction of the precipitate can associate to form relatively large particles that are present in the precipitate after fragmentation and that can contribute a "chalky" or "gritty" texture to the dispersion. Treatment of the heated suspension/solution of the precipitate with acid or enzyme to hydrolyze a substantial portion of the soluble fraction can reduce or eliminate such large particles. Typical treatment conditions will involve mild hydrolysis catalyzed by acid, e.g. in a solution of 0.1 N HCl for one hour, or, preferably, by enzyme, e.g. α-amylase.

The precipitated amylose is then treated with an α-amylase enzyme, i.e. an endo-enzyme capable of hydrolyzing the 1,4-glucosidic bond of amylose and amylopectin to yield products having an α configuration. The enzyme is allowed to act upon the precipitated amylose and thereby hydrolyze those regions in the precipitate that are susceptible to hydrolysis. The optimum concentration of enzyme and substrate in the hydrolysis medium will, in general, depend upon the level of activity of the enzyme which, in turn, will vary depending upon the enzyme source, enzyme supplier and the concentration of the enzyme in commercial batches.

The α-amylase can be from a variety of sources. Common sources of α-amylase are bacterial, e.g. *Bacillus subtilis*, or fungal, e.g. *Aspergillus oryzae*, or mammalian, e.g. human salivary, porcine pancreatic, etc. The optimum pH and temperature of the hydrolysis medium will also depend upon the choice of enzyme. The hydrolysis medium may, in addition to the water used in the hydrolysis of the starch, contain buffers to ensure that the pH will be maintained at an optimum level throughout the hydrolysis. Examples of useful buffers include acetates, citrates, phosphates, and the salts of other weak acids. With porcine pancreatic α-amylase, the pH is preferably maintained at about 6.0 to 8.0 and the temperature from about 20° C. to about 30° C.

The hydrolysis is allowed to proceed until the desired degree of hydrolysis has been obtained. The precise degree of hydrolysis needed to obtain the desired particle gel of the fragmented, α-amylase hydrolyzed amylose precipitate may vary depending upon the source of the starch and the precise properties desired in the resulting gel. Typically, the degree of hydrolysis will be such that fragmentation of the product will yield a gel that exhibits a transition from a region of substantially constant dynamic elastic modulus (G') versus shear strain to a region of decreasing G' versus shear strain, said transition being at a shear strain of less than about 50 millistrain, and preferably less than about 10 millistrain. The transition indicates fracture of the particle network with the particle gel and is typically a sharp transition. The dynamic elastic modulus can be measured with a Bohlin model VOR Rheometer, from Bohlin Rheologi, Inc., East Brunswick, N.J.

After the desired degree of hydrolysis is obtained, the α-amylase enzyme in solution is deactivated, e.g. by heating to denature the enzyme. The hydrolysis medium may be concentrated by removal of water therefrom, e.g. by evaporation, to facilitate precipitation.

The isolated α-amylase hydrolyzed amylose precipitate is typically washed and then dried (e.g. to a low moisture content, typically 3–12%) after isolation to allow for handling and storage prior to further processing. Examples of drying techniques include spray drying, flash drying, tray drying, belt drying, and sonic drying. The dried precipitate may be hygroscopic. Thus, some rehydration during handling and storage may occur. Depending upon the precise composition of the precipitate and the conditions (including length of time) of storage, steps to maintain the moisture at a low content may be necessary (e.g. moisture barrier packaging and/or control of humidity in the storage environment). If the moisture content is allowed to rise too far (e.g. greater than about 20%, or possibly greater than 15%), bulk handling problems and/or microbiological stability problems might arise.

The α-amylase hydrolyzed amylose precipitate is subjected to a physical fragmentation as by mechanical disintegration, i.e. fragmented. The degree of fragmentation will be sufficient to cause the precipitate to form a particle gel in an aqueous medium. The mechanical disintegration of the precipitate may be carried out in several ways, as by subjecting it to attrition in a mill, or to a high speed shearing action, or to the action of high pressures. Disintegration is generally carried out in the presence of a major amount by weight of a liquid medium, preferably water. Although tap water is the preferred liquid medium for the dispersion of fragmented starch precipitate, other liquids are suitable provided sufficient water is present to hydrate the fragmented starch precipitate and, thus, result in a dispersion having the characteristics of a particle gel. Sugar solutions, polyols, of which glycerol is an example, alcohols, particularly ethanol, isopropanol, and the like, are good examples of suitable liquids that can be in admixture with water in the liquid medium. Typically, however, the starch precipitate will be physically fragmented in potable water.

The mechanical disintegration is preferably accomplished by subjecting an aqueous dispersion of the precipitate to high shear, e.g. in a Waring blender or a homogenizer such as that disclosed in U.S. Pat. No. 4,533,254 (Cook et al.) and commercially available as a MICROFLUIDIZER ™ from Microfluidics Corporation, Newton, Mass., or a homogenizer such as the RANNIE ™ high pressure laboratory homogenizer, Model Mini-lab, type 8.30 H, APV Rannie, Minneapolis, Minn. Homogenizers useful in forming suspensions or emulsions are described generally by H. Reuter, "Homogenization", Encyclopedia of Food Science, pp. 374–376, (M. S. Peterson and A. H. Johnson, eds., AVI Publ. Co., Westport, Conn., 1978), L. H. Rees and W. D. Pandolfe, "Homogenizers", Encyclopedia of Food Engineering, pp. 467–472 (C. W. Hall et al., eds., AVI Publ. Co., Westport, Conn., 1986), and W. C. Griffin, "Emulsions", Encyclopedia of Chemical Technology, Vol. 8, pp. 900–930 (Kirk-Othmer, eds., John Wiley & Sons, Inc., New York, N.Y., 3d ed., 1979), the disclosures of which are incorporated herein by reference.

The temperature of the starch precipitate during the fragmentation step should be maintained below the temperature at which a major portion of the precipitate will dissolve in the aqueous medium. Thus, it may be desirable to cool the precipitate during disintegration. Alternatively, heat produced during fragmentation may cause the precipitate to dissolve, but cooling may cause the dissolved precipitate to reprecipitate and form a useful product. Whatever method is used, the disintegration is carried out to such an extent that the resulting finely-divided product is characterized by its ability to form a particle gel in the liquid medium in which it is attrited or in which it is subsequently dispersed.

The starch particles which make up the particle gel can be analyzed in a variety of ways. Rheological measurements can be made to determine the rheological characteristics of the resulting dispersion. Typically, the aqueous dispersion of starch particles will exhibit a transition in dynamic elastic modulus (G') versus shear strain at less than about 50 millistrain, and preferably less than about 10 millistrain, said transition being from a substantially constant G' versus shear strain to a decreasing G' versus shear strain. The transition indicates fracture of the particle network within the particle gel and is typically a sharp transition.

Analysis of the starch particles formed after dissolution shows that the starch has a measurable crystallinity. The crystalline regions of particles derived from fully debranched waxy maize starch (essentially no amylose component) exhibit a diffraction pattern characteristic of a starch material consisting essentially of A-type starch crystals. The crystalline regions of particles derived from substantially fully debranched common corn starch (about 28% amylose) exhibit a diffraction pattern characteristic of a starch material consisting essentially of B-type starch crystals.

It should also be noted that mechanical disintegration may be sufficient to produce an aqueous dispersion having the desired particle gel characteristics, but still leave a sufficient number of particles of sufficient size to exhibit a "particulate" or "chalky" mouthfeel when ingested. Such chalkiness can be reduced by the mild hydrolysis discussed above or by reducing the particle size of the starch precipitate before, during or after mechanical disintegration so that substantially all (typically at least about 95%, preferably at least 99%) of the precipitate will pass a U.S. #325 mesh sieve (i.e. substantially all particles are less than 45 microns). An example of a milling device suitable for such size reduction is a TROST™ Air Impact Mill from Garlock, Inc., Newton, Pa.

The use of the fragmented, α-amylase hydrolyzed amylose precipitate allows for the replacement of a substantial portion (e.g. from 10% to 100% by weight) of the fat and/or oil in a food formulation. The precise level of replacement that is possible without significantly decreasing the organoleptic quality of the food will generally vary with the type of food. For example, in a French-style salad dressing, it is generally possible to completely replace the oil component that is normally present. In other types of foods, e.g. frostings, icings, cream fillings, ice cream, margarine, etc., a major amount of the fat and/or oil (e.g. about 50% to about 80%) can be replaced with little effect on the organoleptic desirability of the food. Examples of typical foods in which fat and/or oil can be replaced include frostings (e.g. icings, glazes, etc.), creme fillings, frozen desserts (:e.g. ice milk, sherbets, etc.), dressings (e.g. pourable or spoonable salad and/or sandwich dressings), meat products (e.g. sausages, processed meats, etc.), cheese products (e.g. cheese spreads, processed cheese foods), margarine, fruit butters, other imitation dairy products, puddings (e.g. mousse desserts), candy (e.g. chocolates, nougats, etc.), and sauces, toppings, syrups and so on.

Generally, it will be desirable to remove sufficient fat from a given food formulation to achieve a reduction in calories of at least one-third per customary serving or make a label claim of "cholesterol-free". (In this regard, see, for example, the list of standard serving sizes for various foods published in Food Labelling; Serving Sizes, 55 Fed. Peg. 29517 (1990) (to be codified at 21 C.F.R. 101.12), the disclosure of which is incorporated herein by reference, and the restrictions on labelling "cholesterol-free" at Food Labelling; Definitions of the Terms Cholesterol Free, Low Cholesterol and Reduced Cholesterol, 55 Fed. Peg. 29456 (1990)). It should also be noted that the fat removed from a particular formulation may be replaced with an equal amount by weight of an aqueous dispersion of fragmented starch precipitate, but that such equality may not be necessary or desirable in all instances. Further, it may be desirable to remove fat and add another ingredient (e.g. a gum, polydextrose, a protein, etc.) along with the aqueous dispersion of starch precipitate.

While this invention is generally directed to the replacement of fat and/or oil in a food formulation, it is of course within the contemplation of this invention that a fragmented, α-amylase hydrolyzed amylose precipitate will be used in an entirely new formulation to which it contributes fat-like organoleptic qualities but is not, in the strictest sense, replacing a pre-existing fat or oil ingredient. Moreover, it is contemplated that the fragmented, α-amylase hydrolyzed amylose precipitate will have utility as a thickener, bodying agent, or the like in foods that normally do not have a significant fat or oil component.

In general, the fragmented, α-amylase hydrolyzed amylose precipitate is incorporated into the food as an aqueous dispersion, typically comprised of a major amount (i.e. greater than 50% by weight) of water or other liquid medium and a minor amount (i.e. less than 50% by weight, typically 10% to 40%) of starch precipitate solids. Alternatively, the isolated precipitate can be mixed with the food along with water and then subjected to disintegration in those instances when the other ingredients of the food are capable of withstanding the condition of disintegration, e.g. a salad dressing or imitation sour cream.

It is contemplated that commercial production and use may involve hydrolysis, mechanical disintegration, and drying (e.g. spray drying) of the fragmented starch precipitate to produce an item of commerce. This item of commerce will then be purchased by a food processor for use as an ingredient. To incorporate the dried, fragmented, α-amylase hydrolyzed amylose precipitate into a food product, it may be useful and/or necessary to further mechanically disintegrate the starch precipitate while dispersing it into the foodstuff in which it will be employed. However, the techniques employed for such mechanical disintegration should not need to be nearly as vigorous as the original mechanical disintegration prior to drying.

As noted above, the terms "food" and "foodstuffs" are intended broadly, as relating to both nutritional and/or functional food ingredients. It is contemplated that one or more food ingredients may be mixed with the aqueous dispersion of fragmented, α-amylase hydrolyzed amylose precipitate, or even dry mixed with the α-amylase hydrolyzed amylose precipitate prior to mechanical disintegration.

Among the food ingredients which may be included in the food formulations of this invention are flavors, thickeners (e.g. starches and hydrophilic colloids), nutrients (e.g. carbohydrates, proteins, lipids, etc.), antioxidants, antimicrobial agents, non-fat milk solids, egg solids, acidulants, and so on.

Hydrophilic colloids can include natural gum material such as xanthan gum, gum tragacanth, locust bean gum, guar gum, algin, alginates, gelatin, Irish moss, pectin, gum arabic, gum ghatti, gum karaya and plant hemicelluloses, e.g. corn hull gum. Synthetic gums such as water-soluble salts of carboxymethyl cellulose can also be used. Starches can also be added to the food. Examples of suitable starches include corn, waxy maize, wheat, rice, potato, and tapioca starches.

Non-fat milk solids which can be used in the compositions of this invention are the solids of skim milk and include proteins, mineral matter and milk sugar. Other proteins such as casein, sodium caseinate, calcium caseinate, modified casein, sweet dairy whey, modified whey, and whey protein concentrate can also be used herein.

For many foods, it is accepted practice for the user to add the required amount of eggs in the course of preparation and this practice may be followed just as well herein. If desired, however, the inclusion of egg solids, in particular, egg albumen and dried yolk, in the food are allowable alternatives. Soy isolates may also be used herein in place of the egg albumen.

Dry or liquid flavoring agents may be added to the formulation. These include cocoa, vanilla, chocolate, coconut, peppermint, pineapple, cherry, nuts, spices, salts, flavor enhancers, among others.

Acidulants commonly added to foods include lactic acid, citric acid, tartaric acid, malic acid, acetic acid, phosphoric acid, and hydrochloric acid.

Generally, the other components of the various types of food formulations will be conventional, although precise amounts of individual components and the presence of some of the conventional components may well be unconventional in a given formulation. For example, the conventional other components for foods such as frozen desserts and dressings, are described in European Patent Publication No. 0 340 035, published Nov. 2, 1989 (the pertinent disclosure of which is incorporated herein by reference), and the components and processing of table spreads is disclosed in U.S. Pat. No. 4,869,919 (Lowery), the disclosure of which is incorporated by reference.

A particularly advantageous use of the fragmented starch precipitates described herein may be the use thereof to replace a portion of the shortening used in a layered pastry article. In layered pastry articles (Danish, croissants, etc.), layers of a bread dough are assembled with a "roll-in" placed between the layers. The roll-in commonly contains a "shortening" (i.e. a fat and/or oil component) from an animal (e.g. butter) or vegetable (e.g. partially hydrogenareal soybean oil) source. The assembled article, optionally containing a filling or topping, is then baked to form a finished pastry. At least a portion of the shortening of an otherwise conventional roll-in can be replaced with an aqueous dispersion of fragmented, α-amylase hydrolyzed amylose precipitate, preferably in admixture with an emulsifier (e.g. mono- and/or di-glycerides), and used to make a layered pastry.

The following examples will illustrate the invention and variations thereof within the scope and spirit of the invention will be apparent therefrom. All parts, percentages, ratios and the like are by weight throughout this specification and the appended claims, unless otherwise noted in context.

EXAMPLES

EXAMPLE 1

Into a 4-liter beaker was placed 118 grams of potato amylose (A0512 Sigma Chemical Co., St. Louis, Mo.) and 2242 grams aleionized water to give a 5% slurry. The slurry was heated to 98° C. in a water bath to solubilize the amylose and this solution was placed in a refrigerator overnight to promote precipitation/crystallization. The resulting slurry was centrifuged at about 6000× g using an IEG model B-22 centrifuge and the supernatant was discarded. The wet sediment was resuspended in aleionized water to about 2000 ml volume and heated to 98° C. in a water bath to solubilize that portion of amylose susceptible to solubilization at that temperature then the mixture was placed in a refrigerator overnight to promote precipitation/crystallization. The resulting slurry was again centrifuged as before and the supernatant discarded. The sediment was resuspended in water, heated to 98° C. in a water bath to solubilize some amylose, cooled to promote precipitation/crystallization and centrifuged one last time. The resulting centrifuged wet sediment containing 8.1% dry substance was placed in a sample jar and stored in a refrigerator.

Into a 5-liter 3-neck round bottom flask equipped with a stirrer and temperature controlled water bath was placed 792 grams of the wet freshly precipitated potato amylose above, 2356 grams aleionized water and 64 grams of molar phosphase buffer at pH 6.9. The suspension was stirred and the pH maintained at 6.9. To this suspension was added 320 units (5 units/gram amylose) of porcine pancreatic α-amylase enzyme (A6255, Sigma Chemical Co., St. Louis, Mo.). The mixture was allowed to react with stirring at 25° C. for 24 hours then one half of the mixture was added to 8 volumes of ethanol (formula 3A) with stirring in a 4-liter beaker. The resulting aqueous alcoholic mixture was centrifuged as above at about 6000× g and the sediment dried in a vacuum oven overnight at 50° C.

A 10% dry solids slurry of the dried product above was sheared using a small Waring blender at controlled conditions (120 volts, 60° C., 8½ minutes) and left to stand 3 hours before the sample was sent for analysis for yield stress, 17O NMR water immobilization, molecular weight by GPC and cold-water solubles. The results of these analyses of the resulting creme are as ($M_w$) of 55,900, a number average ($M_n$) of 9,100 and a follows, An analysis of the molecular weight (by gel permeation chromatography) showed a weight average peak molecular weight of 32,000. The water immobilization (by $^{17}O$ NMR) exhibited by the creme was 177 sec$^{-1}$ and the yield stress was 531 pascals. The cold-water solubles of the powder were 13% by weight.

It is speculated that further enzyme hydrolysis to give a level-off DP of about 65 will result in even greater $O^{17}$ NMR, water immobilization values.

EXAMPLE 2

SPOONABLE SALAD DRESSING A spoonable dressing can be prepared from the creme of Example 1 as follows.

| Ingredients | %, wt. |
|---|---|
| Part A | |
| Water | 22.00 |
| ISOSWEET ® 100 high fructose corn syrup (Staley) | 17.00 |
| Vinegar, white, 100 grain | 10.00 |
| SWEETOSE ® 4300 corn syrup (Staley) | 5.00 |
| STAR-DRI ® 35R corn syrup solids (Staley) | 3.20 |
| DELTA 7393 starch (Staley) | 2.85 |
| Salt | 1.80 |
| Carboxymethyl cellulose 7MF (Aqualon) | 0.20 |
| Mustard powder (McCormick) | 0.10 |
| Titanium dioxide (Warner-Jenkinson) | 0.08 |
| Garlic powder | 0.05 |
| Onion powder | 0.05 |
| Paprika | 0.0125 |
| Calcium disodium EDTA | 0.0075 |
| Part B | |
| Creme of Example 1 (10% dry solids) | 27.40 |
| Soybean oil | 8.00 |
| Egg yolk, fresh | 2.00 |
| Lemon juice, single strength | 0.25 |
| Total | 100.00 |

Procedure

1. Place water, vinegar, ISOSWEET, and SWEETOSE into a steam jacketed, swept surface cooker.

2. Thoroughly blend the dry ingredients of Part A, then disperse them into the water/vinegar/syrup mixture with agitation. Continue mixing while heating with steam to 190° F. Maintain this temperature for 5 minutes (with mixing); then immediately cool to 90° F.

3. Transfer Part A to a Hobart bowl; add egg yolk, creme, and lemon juice. Mix at low speed for 5 minutes with paddle.

4.
Slowly add soybean oil and mix for another 5 minutes.

5. Process through a colloid mill at a 0.026" setting. Pack off finished product.

EXAMPLE 3

BUTTERMILK DRESSING A buttermilk dressing can be prepared from the creme of Example 1 as follows.

| Ingredients | %, wt. |
| --- | --- |
| Buttermilk, liquid, 1% fat | 30.00 |
| Water | 23.94 |
| Creme of Example 1 | 23.50 |
| STAR-DRI ® 10 maltodextrin (Staley) | 8.00 |
| Vinegar, white, 100 grain | 5.40 |
| Seasoning mix #962-2489 (Griffith Labs) | 5.00 |
| Buttermilk solids, Beatreme #983 (Beatrice) | 1.00 |
| Instant TENDER-JEL ® C starch (Staley) | 1.00 |
| Salt | 0.75 |
| Sugar | 0.65 |
| Carboxymethyl cellulose, 7 MF (Aqualon) | 0.40 |
| Titanium dioxide (Warner-Jenkinson) | 0.10 |
| Potassium sorbate | 0.08 |
| Sodium benzoate | 0.0725 |
| Garlic powder | 0.05 |
| Onion powder | 0.05 |
| Calcium disodium EDTA | 0.0075 |
| Total | 100.00 |

Procedure

1. Blend all dry ingredients together.
2. Place water and buttermilk into a Hobart mixing bowl. Disperse the dry ingredient blend into this water/buttermilk mixture; mix with a Hobart paddle for 10 minutes at low speed.
3. Add the creme and mix for 10 minutes at medium speed.
4. Add vinegar and mix for 1 minute.
5. Process through a colloid mill at a 0.02" setting. Pack off finished product.

EXAMPLE 4

FRENCH DRESSING A French dressing can be prepared from the creme of Example 1 as follows.

| Ingredients | %, wt. |
| --- | --- |
| Creme of Example 1 | 35.00 |
| ISOSWEET ® 100 high fructose corn syrup (Staley) | 25.00 |
| Water | 23.98 |
| Vinegar, white, 100 grain | 10.00 |
| Tomato paste, 24–26% solids | 3.50 |
| Salt | 1.50 |
| Seasoning mix #912-0135 (Griffith Labs) | 0.30 |
| MIRA-THIK ® 468 starch (Staley) | 0.30 |
| Seasoning mix #F34037 (McCormick) | 0.10 |
| Xanthan gum, Keltrol TF (Kelco) | 0.10 |
| Guar gum #8/22 (TIC Gums) | 0.05 |
| Mustard powder | 0.05 |
| Potassium sorbate | 0.05 |
| Titanium dioxide (Warner-Jenkinson) | 0.04 |
| Paprika | 0.0225 |
| Calcium disodium EDTA | 0.0075 |
| Color, yellow FD&C #5/#6 | to suit |
| Total | 100.00 |

Procedure

1.
Place water and ISOSWEET into a Hobart bowl. Blend all dry ingredients together and disperse into the water and ISOSWEET mixture. Mix at low speed and allow to hydrate for 5 minutes.

2. Add tomato paste, creme and vinegar. Mix for 5 minutes.
3. Process through a colloid mill at a 0.02" setting. Pack off finished product.

EXAMPLE 5

DIJON DRESSING A Dijon vinaigrette dressing can be prepared from the creme of Example 1 as follows.

| Ingredients | %, wt. |
| --- | --- |
| Water | 38.90 |
| Creme of Example 1 | 25.00 |
| Vinegar, white, 100 grain | 14.00 |
| Sugar | 6.50 |
| Dijon mustard (McCormick) | 6.00 |
| Lemon juice, single strength | 6.00 |
| Salt | 2.35 |
| Spice blend #F30378 (McCormick) | 1.00 |
| Xanthan gum, Keltrol TF (Kelco) | 0.14 |
| Red bell pepper, dried (McCormick) | 0.05 |
| Potassium sorbate | 0.04 |
| Annatto extract (Warner-Jenkinson) | 0.0125 |
| Calcium disodium EDTA | 0.0075 |
| Total | 100.00 |

Procedure

1. Place water in Hobart bowl.
2. Blend together all dry ingredients except the spice blend and red pepper. Disperse the dry ingredient blend into the water and mix with a paddle at low speed for 5 minutes.
3. Add the creme, mustard, vinegar and lemon juice. Mix for 5 minutes at low speed.
4. Process through a colloid mill at a 0.02" setting.
5. Blend in spice blend and red pepper. Then pack off product.

EXAMPLE 6

SOUR CREAM A sour cream can be prepared from the creme of Example 1 as follows.

| Ingredients | %, wt. |
| --- | --- |
| Creme of Example 1 | 39.79 |
| Sour cream, 18–20% fat | 29.83 |
| Water | 23.41 |
| Non-fat dry milk, low heat (Land O'Lakes) | 5.97 |
| Lactic acid, 88% | 0.40 |
| Xanthan gum, Rhodigel (Rhone-Poulenc) | 0.20 |
| Salt | 0.20 |
| Sodium citrate, hydrous, fine granular (Pfizer) | 0.20 |
| Total | 100.00 |

Procedure

1. Add lactic acid to water, thoroughly mix at Speed 1 with a Hobart mixer equipped with a wire whip.
2. Mix in sour cream and then all dry ingredients; mix until the mixture is uniform.
3. Blend in the creme to form a semi-homogeneous mixture.
4. Homogenize for smoothness.
5. Pack off and refrigerate until ready to use.

EXAMPLE 7

TABLE SPREAD A table spread can be prepared from the dry precipitate of Example 1 as follows.

| Ingredients | %, wt. |
|---|---|
| Part A | |
| Water | 25.00 |
| Xanthan gum, Rhodigel (Rhone-Poulenc) | 0.10 |
| Part B | |
| Water | 32.7306 |
| Dry precipitate of Example 1 | 12.90 |
| STAR-DRI ® 15 maltodexrin (Staley) | 7.00 |
| Whey powder sweet, #27231 (Land O'Lakes) | 1.00 |
| Salt | 0.90 |
| Potassium sorbate | 0.10 |
| Calcium disodium EDTA | 0.0075 |
| Artificial color, egg shade #08038 (Warner-Jenkinson) | 0.0004 |
| Part C | |
| STALEY ® 400-0300 partially hydrogenated corn oil (Staley) | 19.83 |
| Monoglycerides, Dimodan LSK (Grinsted) | 0.24 |
| Lecithin, M-C-Thin AF1/SB (Lucas Meyer) | 0.15 |
| Flavor #57.752/A (Firmenich) | 0.03 |
| Antioxidant, Tenox 2 (Eastman) | 0.01 |
| B-Carotene, 30% in vegetable oil (Hoffmann-LaRoche) | 0.0015 |
| Total | 100.00 |

Mixing Procedure

1. Use a high speed mixer to mix Part A ingredients until xanthan gum is dissolved.
2. Combine Part A and Part B ingredients and mix at slow speed until uniform.
3. While mixing, heat Part A and Part B mixture to 120°–130° F.
4. Mix Part C ingredients together and heat to 120°–130° F.
5. Pour aqueous phase (Parts A and B) into oil phase (Part C) while stirring vigorously.
6. Homogenize the entire mixture at a pressure of 8,000 to 15,000 psi and an output temperature of 140°–150° F.
7. Immediately cool to 50° F. while stirring.
8. Pack off and refrigerate.

EXAMPLE 8

ALPHA-AMYLASE HYDROLYSIS OF HEAT TREATED, DEBRANCHED 55% AMYLOSE CORN STARCH

A 2% solids slurry of 55% high amylose corn starch (HI-SET C) was prepared by mixing 452.3 grams (400 grams dry basis) of HI-SET C corn starch with deionized water to give a total volume of 20 liters. The suspension was heated in 2-liter batches up to 160° C. in a pressure reactor then cooled to about 30° C. to 50° C. by passing the hot solution through a cooled heat exchanger tube. The pH of the solution was adjusted to approximately 4.5 and the solution was placed in two 12-liter round bottom flasks equipped with agitation, condensers, and heat controlled water baths. The temperature was adjusted to 45° C. and 400 units per gram dry basis starch of isoamylase enzyme (from Hayashibara Co. and containing 865,000 units/gram) was added to each solution. The solutions were allowed to react 20 hours then the 2% solids solutions/dispersions (the debranched starch tends to precipitate with time) were heated to 160° C. in the pressure reactor as before to completely dissolve the precipitated starch and make it more readily available for isoamylase enzyme attack. The solutions were cooled, the pH again checked and found to be approximately 4.5, then 400 units per gram dry basis starch of isoamylase enzyme was again added and the reaction was allowed to proceed 18 hours at 45° C. for a total reaction time of 38 hours.

The 2% solution/suspension after 38 hours of isoamylase digestion was heated to approximately 95° C. to inactivate enzyme then concentrated by rotary evaporation over a 2-day period (stored in a refrigerator overnight) to approximately 15% solids. This slurry was dried on stainless steel trays at 60° C. in a forced air oven overnight and the dried material ground to pass through a US #60 mesh sieve.

To 380 grams (350 grams dry basis) of the above dried, screened material was added 1,720 grams of deionized water to give a 20% solids slurry. The slurry was heat treated by controlled heating in a temperature controlled water bath from 50° C. up to 100° C. at the rate of 0.05° C. per minute followed by controlled cooling from 100° C. down to 50° C. at the rate of 0.05° C. per minute. The heat treated slurry was poured onto a stainless steel tray and dried in a forced air oven at 50° C. then ground to pass through a US #60 mesh sieve. This sample served as a substrate for α-amylase hydrolysis treatment to improve the ease of creme formation on shearing.

The above starch substrate was enzyme hydrolyzed at 20% solids (375 grams total slurry wt.) at 25° C. with 15 units/gram starch of porcine pancreatic α-amylase (Sigma Chemical Company). Samples of reaction slurry were withdrawn (125 grams each) after 8 hours, 21 hours, and 48 hours of hydrolysis and the pH adjusted to 3.5 to inactivate enzyme. The 8 hour and 21 hour samples were filtered on a Buchner funnel followed by washing with about 250 ml each with aleionized water. The sample hydrolyzed 48 hours would not filter (very, very slow) and was centrifuged (7000×g), the supernatant discarded, then aleionized water added back to the original sample weight. After stirring to give a homogenous mixture, this slurry was centrifuged as above and the supernatant discarded. This procedure was repeated a final time. All wet cakes or sediment (from filtration or from centrifugation) were mixed with 8 volumes of ethanol (formula 3A) to denature any remaining enzyme. They were then either filtered or centrifuged one last time. The wet cakes and sediment were dried in a 50° C. forced air oven and ground to pass through a US #60 mesh sieve. The products were weighed and yields were calculated for each. Yield stress values were obtained on 20% solids cremes prepared by shearing at 120 volts, 60° C for 8½ minutes with a Waring blender equipped with a small jacketed jar. The yield stress values were measured using a Brookfield viscometer after the cremes stood at least 3 hours at room temperature. The analytical results are reported below.

| α-Amylase Hydrolysis Time, hr. | Product Yield, % db | Yield Stress, Pascals |
|---|---|---|
| 0 | — | 36 |
| 8 | 87.0 | 288 |
| 21 | 84.2 | 348 |
| 48 | 80.9 | 365 |

It was noted that the texture of the 8 hour creme was the most gritty while the 48 hour sample was more creamy and less gritty. It is speculated that continued enzyme hydrolysis would continue to improve texture (less gritty) and increase yield stress values.

It was noted that the pH of the 48 hour hydrolyzed sample declined to 5.7 (from 6.9). It is likely that this was caused by undesirable fermentation to form organic acids. Such a large decline in pH likely also caused reduced enzyme hydrolysis activity compared to what may have occurred if the pH had remained at 6.9.

It is concluded that the enzyme hydrolysis gave considerable improvement in the shearability of the heat treated, debranched high amylose starch. In addition, it also resulted in improved smoothness of texture.

EXAMPLE 9

DEBRANCHED HIGH AMYLOSE CORN STARCH

A 55% amylose corn starch (HI-SET C) is made up to 25% solids then jet cooked at 160° C. with a retention time of 10 minutes at 160° C. then cooled to ~100° C. The pH of the solution if adjusted to pH 6.0. Novo thermostable pullulanase enzyme as described in WO 92/02614 is added at 50 units per gram of starch and the reaction is allowed to proceed at 100° C. for 24 hours at which time GPC analysis will show that less than 10% of the remaining amylose or amylopectin molecules are above about 100,000 molecular weight.

The debranched solution is treated with 3% w/w (weight by weight basis) of decolorizing carbon (based on starch dry substance weight) at 90° C. The colorless carbon treated solution is cooled to 5° C. for 16 hours to bring about crystallization. The crystallized mass is dried in a spray drier at 15% solids after dilution with water.

The spray dried material is made up to 20% solids and heated from 50° C. to 100° C. at 0.05° C./minute then cooled to 100° C. at 0.05° C./minute. The heat treated material is adjusted to pH 6.9 and treated at 20% solids at 25° C. for 24 hours using approximately 50 units per gram dry starch of porcine pancreatic α-amylase enzyme. The resulting slurry is adjusted to pH 3.5, with 10% HCl heated to 60° C. and held at that pH and temperature about 1 hours to inactivate enzyme then microfiltered at 60° C. to reduce the soluble saccharide content to less than 10% (measured at room temperature). The retentate slurry is spray dried at about 15% solids to give a heat stable, shearable starch based fat replacer having a yield stress at 20% solids greater than 400 pascals.

What is claimed is:

1. A foodstuff having a reduced level of fat and/or oil comprising a mixture of a foodstuff and a particle gel as a replacement for at least a substantial portion of the fat and/or oil of said foodstuff, said particle gel comprising a minor amount of a fragmented, α-amylase hydrolyzed amylose precipitate and a major amount of an aqueous liquid, wherein the precipitate has been fragmented by mechanical disintegration, wherein said particle gel exhibits a transition in dynamic elastic modulus versus shear strain from substantially constant dynamic elastic modulus to decreasing dynamic elastic modulus, said transition being exhibited at a shear strain of less than about 50 millistrain, and wherein at least about 95% of the fragmented precipitate bas a particle size of less than 45 microns.

2. A foodstuff of claim 1 wherein said fragmented, α-amylase hydrolyzed amylose precipitate is derived from starch from a variety of Zea mays.

3. A foodstuff of claim 1 wherein said fragmented, α-amylase hydrolyzed amylose precipitate is derived from a starch having a,t least about 15% by weight amylose.

4. A method of formulating a foodstuff containing a fat and/or oil ingredient comprising replacing at least a substantial portion of said fat and/or oil ingredient with a particle gel comprising a minor amount of a fragmented, amylase hydrolyzed amylose precipitate and a major amount of an aqueous liquid, wherein the precipitate has been fragmented by mechanical disintegration, wherein said particle gel exhibits a transition in dynamic elastic modulus versus shear strain from substantially constant dynamic elastic modulus to decreasing dynamic elastic modulus, said transition being exhibited at a shear strain of less than about 50 millistrain, and wherein at least about 95% of the fragmented precipitate has a particle size of less than 45 microns.

5. A method of claim 4 wherein said fragmented, α-amylase hydrolyzed amylose precipitate is derived from starch from a variety of Zea mays.

6. A method of claim 4 wherein said fragmented, α-amylase hydrolyzed amylose precipitate is derived from a starch having at least about 15% by weight amylose.

7. A method of making a composition of matter useful in replacing fat and/or oil in a food formulation comprising physically fragmenting by mechanical disintegration a minor amount of an α-amylase hydrolyzed amylose precipitate in a major amount of an aqueous liquid, wherein at least about 95% of the fragmented precipitate has a particle size of less than 45 microns, the degree of said physically fragmenting and the degree of hydrolysis being sufficient to form a particle gel of said composition, wherein said particle gel exhibits a transition in dynamic elastic modulus versus shear strain from substantially constant dynamic elastic modulus to decreasing dynamic elastic modulus, said transition being exhibited at a shear strain of less than about 50 millistrain.

8. A method of claim 7 wherein said α-amylase hydrolyzed amylose precipitate is derived from starch from a variety of Zea mays, 9. A method of claim 7 wherein said α-amylase hydrolyzed amylose precipitate is derived from a starch having at least about 15% by weight amylose.

10. An aqueous dispersion useful as a replacement for fats and/or oils comprising a major amount by weight of water and a minor amount by weight of a fragmented, α-amylase hydrolyzed amylose precipitate, the degree of hydrolysis and fragmentation of said precipitate being sufficient to form a particle gel of said dispersion, wherein the precipitate has been fragmented by mechanical disintegration, wherein said particle gel exhibits a transition in dynamic elastic modulus versus shear strain from substantially constant dynamic elastic modulus to decreasing dynamic elastic modulus, said transition being exhibited at a shear strain of less than about 50 millistrain, and wherein at least about 95% of the fragmented precipitate has a particle size of less than 45 microns.

11. An aqueous dispersion of claim 10 wherein said fragmented, α-amylase hydrolyzed amylose precipitate is derived from starch from a variety of Zea mays.

12. An aqueous dispersion of claim 10 wherein said fragmented, α-amylase hydrolyzed amylose precipitate is derived from a starch having at least about 15% by weight amylose.

13. A method of making a composition of matter useful in replacing fat and/or oil in a food formulation comprising:
   (a) gelatinizing a starch having an amylose content of at least about 15% by weight in an aqueous medium;
   (b) precipitating amylose from an aqueous medium to form a amylose precipitate from said aqueous medium;
   (c) treating said precipitated amylose with an α-amylase enzyme to hydrolyze a portion of the 1,4-glucosidic bonds in said precipitated amylose to form an α-amylase hydrolyzed amylose precipitate; and
   (d) fragmenting by mechanical disintegration said α-amylase hydrolyzed amylose precipitate in an aqueous medium to form a particle gel having a minor amount of fragmented, α-amylase hydrolyzed amylose precipitate dispersed in a major amount of an aqueous medium, wherein at least about 95% of the fragmented precipitate bas a particle, size of less than 45 microns, said particle gel exhibiting a transition in dynamic elastic modulus versus shear strain from substantially constant dynamic elastic modulus to decreasing dynamic elastic modulus, said transition being exhibited at a shear strain of less than about 50 millistrain.

* * * * *

UNITED STATES PATENT AND TRADEMARK OFFICE
CERTIFICATE OF CORRECTION

PATENT NO. : 5,436,019
DATED : July 25, 1995
INVENTOR(S) : Donald W. Harris, et al It is certified that error appears in the above-indentified patent and that said Letters Patent is hereby corrected as shown below:

In claim 1, column 17, line 67, delete "bas" and replace with --has--.

In claim 3, column 18, line 6, "a,t" should be --at--.

In claim 4, column 18, line 12, "amylase" should be --$\alpha$-amylase--.

In claim 8, column 18, line 47, delete "," at end of line and insert --.--.

In claim 13, column 20, line 9, delete "bas" and replace with --has--.

In claim 13, column 20, line 10, delete "," after the word "particle".

Signed and Sealed this

Twenty-seventh Day of February, 1996

Attest:

BRUCE LEHMAN

*Attesting Officer*     *Commissioner of Patents and Trademarks*